United States Patent [19]

Yoshikawa

[11] 4,244,235

[45] Jan. 13, 1981

[54] APPARATUS FOR ATTACHING A BRAKE LEVER STAY TO A HANDLE BAR OF A BICYCLE

[75] Inventor: Kunihiko Yoshikawa, Soka, Japan

[73] Assignee: Kabushiki Kaisha Yoshikawa Seisakusho, Yashio, Japan

[21] Appl. No.: 955,023

[22] Filed: Oct. 25, 1978

[30] Foreign Application Priority Data

Apr. 18, 1978 [JP] Japan .............................. 53/50269[U]

[51] Int. Cl.³ .................. B62K 23/06; B62L 3/02; F24H 9/06
[52] U.S. Cl. ...................................... 74/489; 248/231
[58] Field of Search ................ 74/488, 489; 248/230, 248/231, 74 B

[56] References Cited

U.S. PATENT DOCUMENTS

| 2,699,203 | 1/1955 | White | 248/231 X |
| 4,005,613 | 2/1977 | Kaufman et al. | 74/489 |

Primary Examiner—Allan D. Herrmann
Attorney, Agent, or Firm—Haseltine, Lake & Waters

[57] ABSTRACT

Apparatus for attaching a stay for a brake lever to a handle bar of a bicycle in which a non-ferrous metal or synthetic resin stay pivotably supports a brake lever through a pivot shaft by a fastening band mounted in a cavity portion formed in the bottom of the stay. A spacer is mounted within the cavity portion and has first support elements for abutting against the handle bar and second support elements for engaging the pivot shaft such that when the band is secured to the pivot shaft frictional engagement is obtained between the first supporting elements and the handle bar and the stay becomes secured to the handle bar through the spacer.

10 Claims, 3 Drawing Figures

APPARATUS FOR ATTACHING A BRAKE LEVER STAY TO A HANDLE BAR OF A BICYCLE

FIELD OF THE INVENTION

The invention relates to apparatus for attaching a stay for a brake lever to a handle bar for a bicycle.

PRIOR ART

This type of stay is generally required to be attractive in appearance and to have a pleasing shape, and accordingly it has been conventional hitherto to produce the stay either by die casting a non-ferrous metal or by molding a synthetic resin which makes is easy to obtain such shape. However, a non-ferrous metal or a synthetic resin product is disadvantageous since it develops insufficient frictional engagement with the handle bar which is made of steel pipe and is liable to slip at its contact surface even if fastened to the handle by means of a fastening band mounted in a cavity portion formed in the bottom of the stay. Additionally, the stay is liable to be broken by the fastening of the band, so that rigid and secure attachment thereof cannot be obtained.

SUMMARY OF THE INVENTION

An object of the invention is to provide apparatus for attaching a stay to a tubular handle bar which will overcome the disadvantages set forth above.

A further object of the invention is to provide such apparatus in which the stay will be secured to the tubular handle bar by means of a spacer which will provide high frictional contact with the handle bar.

In accordance with the invention there is provided an apparatus for attaching a stay for a brake lever to a tubular handle bar in which said stay is constructed of a non-ferrous metal or synthetic resin, said stay supporting a pivot shaft on which the brake lever is pivotably mounted, said stay having a cavity portion in which projects a fastening band engaging the handle bar, the fastening band being secured to the pivot shaft by an adjustable tightening fastener, the improvement comprising a spacer element engaged in said cavity and including first means for engaging the handle bar and second means for engaging the pivot shaft, said spacer element being constituted of a material which develops friction with said handle bar such that when the adjustable fastener is tightened frictional engagement is developed between the spacer element and said handle bar to hold the stay on the handle bar in secured position.

The spacer element may be a ferrous material such as iron or steel.

DETAILED DESCRIPTION

Figure 1:
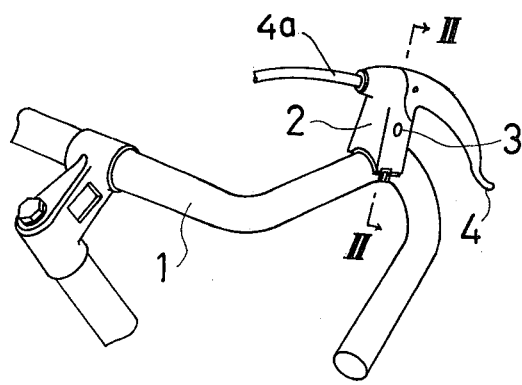
FIG. 1 is a perspective view of one embodiment of the invention.
Figure 3:
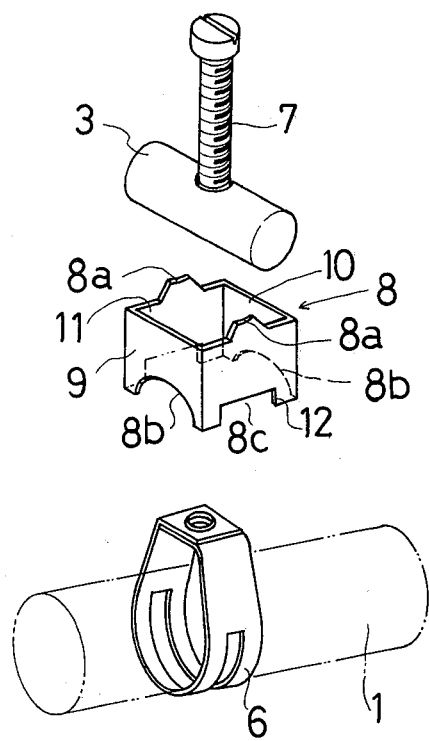
FIG. 3 is an exploded perspective view of a portion of the structure in FIG. 2.
Figure 2:
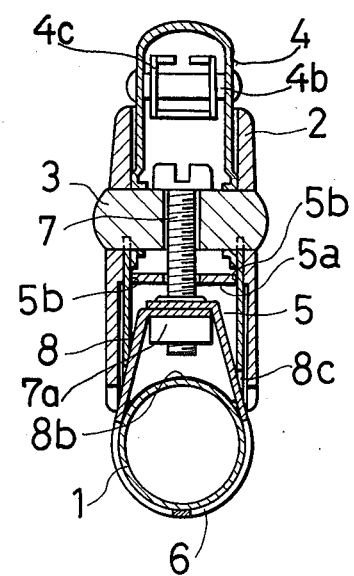
FIG. 2 is a sectional view taken along line II—II in FIG. 1.

Referring to the drawing, numeral 1 denotes a tubular handle bar for a bicycle or the like and numeral 2 denotes a stay for a brake lever. The stay 2 is made either by die casting a non-ferrous metal or molding a synthetic resin material. The stay 2 mounts a brake lever 4, which is pivotally supported thereon by a pivot shaft 3 inserted in the middle portion of the stay 2. The brake lever 4 is connected to an actuator cable 4a which actuates brakes of the bicycle when the lever 4 is pivotably moved. The lever 4 is hollow and carries a shaft 4b on which the cable 4a is wound (not shown in FIG. 2) and the cable is held in place by a retainer 4c. A fastening band 6 is mounted in a cavity portion 5 formed in a bottom portion of the stay and the band 6 is in threaded engagement via a nut 7a at a base end with an adjustable fastening bolt 7 inserted through and engaged with the pivot shaft 3 perpendicularly thereto so that the band 6 may be fastened to the handle 1 by tightening the fastening bolt 7 in nut 7a.

The arrangement up to this point is substantially conventional.

According to the invention, a spacer 8 in the form of a box-shaped frame is mounted in the cavity portion 5 and is substantially confined therewithin. The box-shaped frame is open at top and bottom. The spacer 8 has front and rear walls 9, 10 and opposite side walls 11, 12. The spacer 8 is provided with supporting elements 8a on the upper edge of the side walls which are inserted in a pair of left and right openings 5b provided in the bottom surface 5a of the cavity portion 5 serving as a means for engaging and supporting the lower surface of the pivot shaft 3. The supporting elements 8a are in the form of projections which are provided with recesses shaped to receive the lower surface of the pivot shaft 3. The spacer 8 also has curved recesses 8b at the lower edges of the front and rear walls 9, 10 projecting at the lower open portion of the cavity portion 5 and shaped to conform to the handle bar for engaging one side surface of the handle bar 1 in a front and rear relationship. Numeral 8c denotes a pair of grooves in the lower edges of the side walls 11, 12 for allowing the band 6 to pass therethrough. The spacer 8 is made of a material which develops friction with the handle bar such that when the adjustable fastener bolt 7 is tightened frictional engagement is developed between the spacer and the handle bar. As an example, the spacer 8 can be made of a ferrous metal such as iron or steel.

According to the invention, the stay 2 made of non-ferrous metal or synthetic resin is provided in the cavity portion 5 containing the fastening band 6 with the iron or steel spacer 8 mounted therein, the spacer 8 being formed with the supporting elements 8a, for supporting the pivot shaft 3 for the lever 4 and with the supporting elements 8b for abutting the handle 1, so that by fastening of the band 6 by tightening bolt 7, the stay 2 is secured to the handle 1 through the spacer 8. Accordingly, the contact surfaces of the stay and the handle 1 are those between an iron or steel product and sufficient frictional engagement therewith is obtained whereby the stay can be securely and stably attached to the handle. Additionally, the surface pressure acting on the bearing surface of the pivot shaft 3 caused by fastening of the band 6 is applied to the supporting elements 8a of the spacer 8 and consequently the load on the bearing surface of the stay 2 is removed or substantially diminished and thus any deformation or cracking of the stay 2 can be prevented.

What is claimed is:

1. In apparatus for attaching a stay for a brake lever to a tubular handle bar in which said stay is constructed of a non-ferrous metal or synthetic resin, said stay supporting a pivot shaft on which the brake lever is pivotably mounted, said stay having a cavity portion in which projects a fastening band engaging the handle bar, the fastening band being secured to the pivot shaft by an adjustable tightening fastener, the improvement comprising a spacer element engaged in said cavity and including first means for engaging the handle bar and second means for engaging the pivot shaft, said spacer element being constituted of a material which develops friction with said handle bar such that when the adjustable fastener is tightened frictional engagement is developed between the spacer element and said handle bar to hold the stay on the handle bar in secured position.

2. The improvement as claimed in claim 1 wherein said spacer element is a ferrous material.

3. The improvement as claimed in claim 2 wherein said spacer element is iron or steel.

4. The improvement as claimed in claim 3 wherein said first means is contituted by curved recesses shaped to conform to the handle bar.

5. The improvement as claimed in claim 4 wherein said second means includes projections provided with recesses shaped to receive the pivot shaft.

6. The improvement as claimed in claim 5 wherein said spacer element is provided with grooves for passage of the fastening band.

7. The improvement as claimed in claim 6 wherein said spacer element is of box shape and has open upper and lower ends.

8. The improvement as claimed in claim 7 wherein said spacer element includes front and rear walls and opposite side walls, said walls having respective upper and lower edges, said projections being on the upper edges of the side walls, said recesses being in the lower edges of the front and rear walls, said grooves being in the lower edges of the side walls.

9. The improvement as claimed in claim 8 wherein said stay has side walls provided with openings for passage of said projections therethrough for engagement with said pivot shaft.

10. The improvement as claimed in claim 9 wherein said cavity portion of said stay is of box shape and substantially confines the spacer element therewithin.

* * * * *